June 26, 1962    E. C. BOPF    3,040,443
CROP DRYER

Filed June 10, 1959    2 Sheets-Sheet 1

INVENTOR.
E.C. BOPF
BY
ATTORNEYS

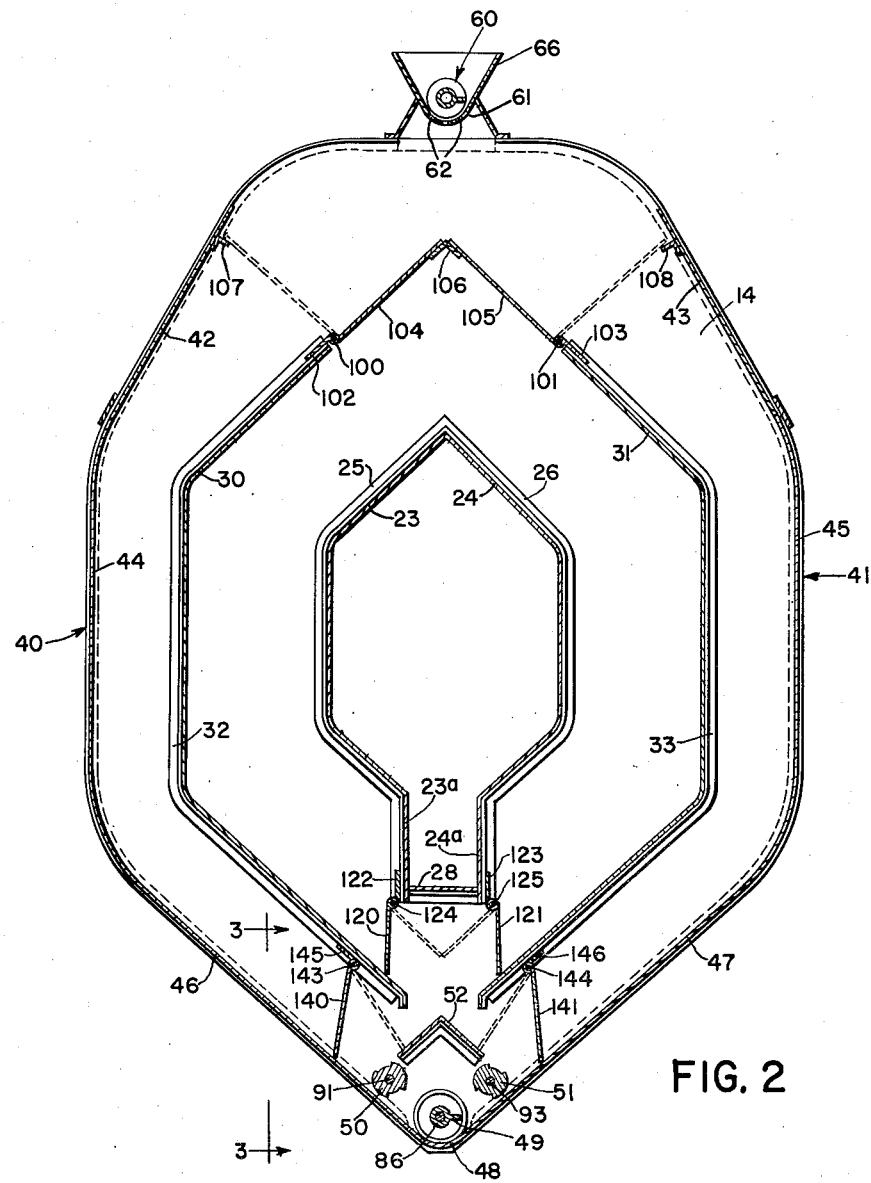

United States Patent Office 3,040,443
Patented June 26, 1962

3,040,443
CROP DRYER
Edward C. Bopf, Des Moines, Iowa, assignor to Deere & Company, Moline, Ill., a corporation of Delaware
Filed June 10, 1959, Ser. No. 819,399
12 Claims. (Cl. 34—174)

This invention relates to a crop dryer of the recirculating type and more particularly to the construction of the drying chambers for the dryer.

In one of the more conventional types of crop dryers, for example, of the type shown in a now pending application of M. W. Forth and H. A. Fink, Jr., Ser. No. 739,792, filed June 4, 1958, now Patent No. 3,000,110, there is provided a centralized heating area with a crop drying chamber surrounding the heating area. The inner and outer walls of the crop drying chamber are perforated to permit the pressurized heated air to move outwardly through the walls and the chamber formed by the walls. Consequently, when crops or material are placed in the chamber, the heated air will tend to dry the material. The material is conventionally fed from above the chambers and is withdrawn from the chambers at the lower portion of the chambers, metering wheels and a suitable conveyor being provided to move the material out of the dryer. The discharge conveyor is adapted to connect to the conveyor-feeder at the top of the dryer to again recirculate the material in the dryer or, if the material has been sufficiently dried, to discharge it to a receptacle outwardly of the dryer. In the recirculating type of dryer, there is normally a continuous flow of material from the upper portion of the dryer to the lower portion and, of course, outwardly of the dryer. One of the great difficulties with this type of dryer occurs due to the fact that various portions of the grain will move or flow at a greater rate than other portions. As a result, some of the grain flowing through the drying chambers will become extremely dry, even to the point of scorching, whereas other portions of grain will retain an abundance of moisture.

In the aforedescribed type of dryer, there must also be maintained a flow of warm air passing throughout the entire drying chamber. This may be readily understood since the grain or material furthest away from the central heated area must be dried to substantially the same extent as that next to the heated area. This results in a generally inefficient operation since the air passing through the outer wall of the drying chamber and into the atmosphere will generally be considerably warm.

It is the main purpose, therefore, of the present invention to utilize the heated air which would normally flow into the atmosphere for initially preheating and partially drying the grain.

It is a further object of the present invention to utilize the heated air which would normally flow through the drying chamber by building a second drying chamber outwardly of the first chamber which may be filled with grain and which will receive the moist yet warm air passing through the drying chamber. Specifically it is desired to provide a drying unit having an inner casing adjacent the heated area, an intermediate casing spaced outwardly from the inner casing and forming an inner drying chamber, and an outer casing spaced outwardly from the intermediate casing forming an outer drying chamber. In the preferred form of the invention, it is proposed to dry the crop in two stages, the first by placing the fresh or undried crop in the outer chamber and the partially dried crop in the inner chamber. In this manner, the warm air required to finish drying the crop in the inner chamber will pass through the inner chamber and then through the outer chamber. The crop in the outer chamber will therefore be partially dried. Upon completion of drying in the inner chamber the crop in the outer chamber will be transferred to the inner chamber where it will be finished dried. Again the outer chamber will be filled with wet corn.

It is a further purpose of the invention to provide a unique system of baffles at the upper end of the crop dryer which will permit crops to enter either the outer chamber or the inner chamber depending on which chamber it is desired to fill, and also at the lower end of the crop dryer to cause individual and selective emptying of the inner and outer chambers again depending upon the chamber it is desired to empty. By the arrangement of baffles the grain in either the inner or outer chambers may be continuously recirculated as it is dried if such is desired.

Other objects and advantages of the present invention will become apparent to those skilled in the art as the nature of the invention is better understood from the following description and as shown in the accompanying drawings.

FIG. 2 is a vertical transverse sectional view taken substantially along the line 2—2 of FIG. 1.

Figure 1:
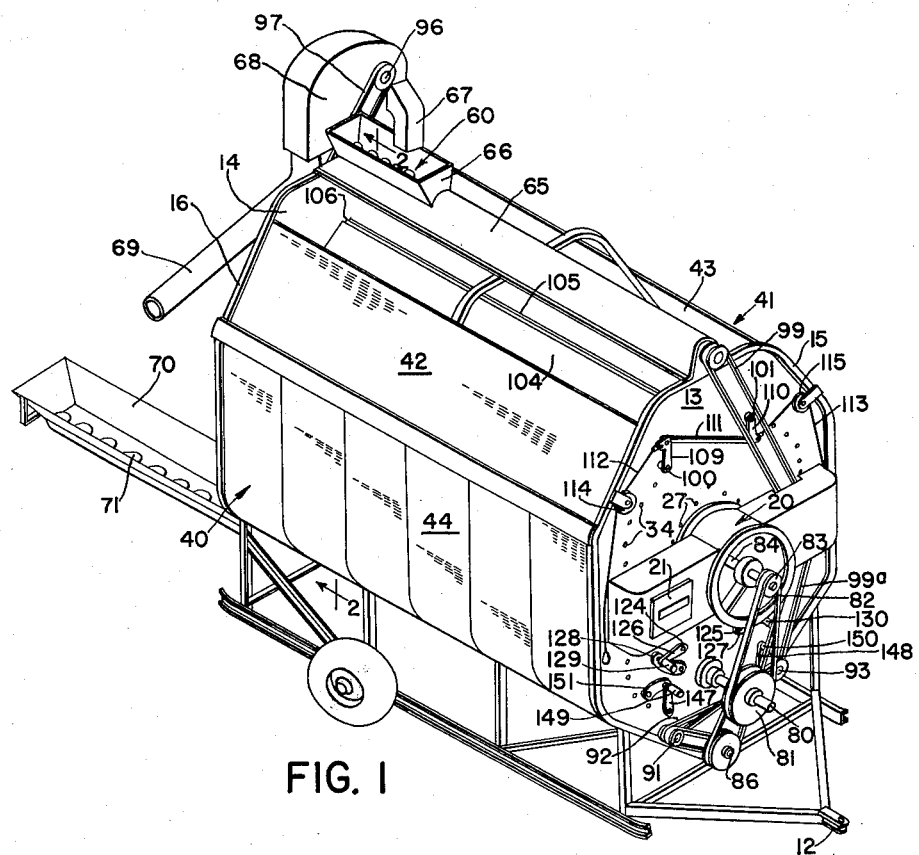
FIG. 1 is a front and side perspective view of a crop dryer incorporating the principles of the present invention.

The crop dryer herein described includes a main frame 10 supported on a pair of transport wheels, one of which is shown at 11. It is conventional in many dryers to permit the wheels to be raised on the frame so as to permit the frame to rest on the ground when not in transport. Details of this nature are not disclosed in the present invention since such is not required for full understanding of the invention. The main frame 10 normally is provided with a forwardly positioned clevis 12 for connection to a tractor drawbar, not shown. The dryer also includes a pair of longitudinally spaced apart and upwardly extending end walls 13, 14 which are supported on the main frame 10. Suitable angle iron framework such as at 15 and 16, extends upwardly from main frame 10 and provides edge support for the walls 13, 14. Supported in the end wall 13 is a furnace structure 20 which heats air moving through it. The furnace 20 has blower means therein which draws the air from the outside, blows it through the heating element, and then discharges the heated air internally of the crop dryer to a pressurized central heated area. Positioned adjacent to the furnace structure 20 is a panel board 21 which controls the operation of the furnace.

Immediately adjacent to and generally surrounding the central area is an inner casing composed of a pair of C-shaped perforated walls 23, 24 which diverge from a common point centrally above the heated area downwardly to a vertical portion and then to a lower converging portion. The wall panels 23, 24 form together an hexagonal casing which terminates in downwardly extending portions 23a, 24a. A laterally disposed panel 28 extends between the lower edges of portions 23a, 24a. The wall panels, 23, 24 are supported on the end walls 13, 14 by angle iron members, such as is shown at 25, 26 in FIG. 2, each having one flange which carries the wall panels 23, 24 and another flange which is riveted, such as at 27, to the end walls 13, 14.

C-shaped intermediate wall structures are spaced from the inner casing formed by the wall panels 23, 24 and form with the inner casing a pair of inner upright crop drying chambers on opposite sides of the heated central area. The wall portions 30, 31 have upper terminal edges spaced apart and have lower terminal edges spaced apart. The crop drying chambers are therefore opened from above to receive crops or material and are open from below to discharge the material or crops. The wall panels 30, 31 are also perforated to permit flow of air. The wall members 30, 31 are supported internally of the crop dryer by means of C-shaped angle iron members, two of which are shown at 32, 33 in FIG. 2, each of which has one flange supporting the wall panels 30, 31 respectively and a second flange lying against the end walls 13, 14. The latter flanges are fixed to the end walls 13, 14 by means of rivets such being shown at 34 in FIG. 1.

Figure 3:
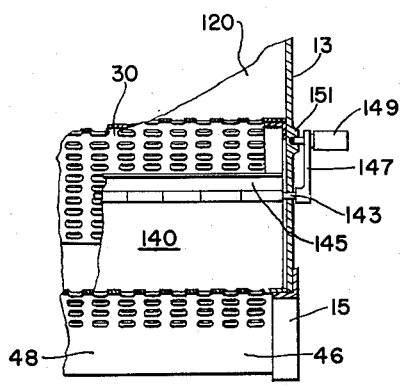
FIG. 3 is a sectional view of a portion of the front wall and its associated control mechanism for the baffles as taken along the line 3—3 of FIG. 2.

Longitudinal outer wall structure extends between the end walls 13, 14 and includes a left outer wall 40 and a right outer wall 41. The outer walls 40, 41 include upwardly inclined sections 42, 43 respectively, upright sections 44, 45 respectively, and lower downwardly inclined sections 46, 47 respectively. As may be seen from viewing FIG. 2, the outer wall sections 42–47 are spaced from and are generally, although not precisely, parallel to the respective wall sections 23, 24 and 30, 31 of the inner wall structure or casing and the intermediate wall structure or casing respectively. The outer walls 40, 41 are also foraminous or perforated to permit air to pass through the walls. The intermediate wall structures 30, 31 and the outer wall structures 42, 43 form between them a vertically disposed crop drying chamber diverging and converging in inclined relation respectively above and below the central heated area. The upper edges of the upwardly inclined portions 42, 43 are spaced apart and provide a relatively large opening at the top of the dryer. The lower portion of the sections 46, 47 form a longitudinal trough 48 supporting a crop discharge auger conveyor 49 which moves the grain from the crop dryer. The trough 48 and adjacent portions of the wall portions are imperforate so as to prevent free passage of air through the lower portion of the dryer when grain is not in that portion, this being shown clearly in FIG. 3. Adjacent to and on opposite sides of the auger 49 are a pair of metering wheels 50, 51 which measures and limits the amount of grain being discharged from the crop dryer. Positioned above and centrally of the metering wheels 50, 51 is an inverted V-shaped panel structure 52 which extends the length of the dryer and has its lower terminal edges adjacent the metering wheels 50, 51. The panel structure 52, the metering wheels 50, 51, and discharge auger 49 extend the length of the crop dryer and are supported at opposite ends by the end walls 13, 14. As will later become apparent, material passing through the inner and outer chambers may pass into the conveyor 49 throughout its entire length. It should however be recognized that the metering mechanism is not a necessary part of this invention, but is preferred for some functions in the drying cycle.

Crops are fed to the crop drying chambers by means of an overhead conveyor in the form of an auger 60. The auger 60 is provided with an auger trough 61 extending the length of the dryer and is supported on the end walls 13, 14. The trough 61 has a plurality of discharge openings 62 in the base of the trough spaced throughout its longitudinal length so as to permit a relatively even distribution of grain within the crop drying chambers. Mounted over the trough 61 is a protective housing 65. The housing 65 extends the entire length of the auger 60 except for an opening at the rear end on which is mounted a hopper type structure 66. The hopper 66 receives grain from a chute 67 of a grain elevator 68 at the rear of the crop dryer. The elevator also is provided with a discharge spout 69 for loading grain into a trailer or truck. Baffles, not shown, are provided and are adjustable to direct grain into either the chute 67 or spout 69.

Projecting from the rear end of the crop dryer is a hopper type structure 70 having an auger type conveyor 71 in its base. The hopper structure may be swung upwardly for purposes of transport. Details of this nature, however, are recognized as being conventional in the art of crop dryers and details of the manner of folding are not deemed necessary for purposes of understanding the present invention. It should be understood that the auger 71 may feed grain directly to the elevator 68 for purposes of filling the crop drying chambers, or the auger 49 may be used to feed directly to the elevator 68 for purposes of recirculating the grain in the crop dryer. Suitable mechanism for adjusting the feed from either the auger 71 or the auger 49 to the elevator, while not shown, is provided and is also conventional in dryers of this nature.

Power for operating the various operating mechanisms in the crop dryer is provided from the forward end of the dryer and includes a main drive shaft 80 connectible through suitable drive means to a power take-off shaft, which is not shown, on the tractor. Supported on the drive shaft 80 is a large belt pulley 81 which drives the blower on the furnace 20 through means of a V-belt 82 which rides over a blower pulley 83 carried on the blower drive shaft 84. A second pulley, not shown, is also supported on the drive shaft 80 and operates to drive the lower auger drive shaft 86 and the drive shaft 91 of the left metering wheel 50. A reverse V-belt drive, indicated in its entirety by the reference numeral 92, extends between the drive shaft 91 and the drive shaft 93 of the right metering wheel 51.

The elevator 68 includes at its upper end a transverse shaft 96. Mounted over the shaft 96 is a V-belt drive, indicated in its entirety by the reference numeral 97, which extends downwardly to the upper auger drive shaft 98. The drive shaft 98 is driven from its forward end by a pair of V-belt drives 99, 99a which receive their power from the shaft 93. Again it should be recognized that the aforesaid driving mechanism, while discussed briefly, is not meant to be a full description of the drive but is discussed only generally and in sufficient manner and only for purposes of fully appreciating the operation of flow of grain in the crop dryer.

Viewing FIG. 2 it becomes apparent that the inner crop drying chamber formed between the casings or wall structures 23, 24 and the intermediate casings or wall structures 30, 31 and the outer crop drying chambers formed between the intermediate casings 30, 31 and the outer walls 40, 41 open to the top of the dryer and may be filled with material through the upper conveyor-feeder 60, 61. Provided adjacent the upper edges of the walls structures 30, 31 are elongated rods 100, 101 extending between the end walls 13, 14 and carried by hinge brackets 102, 103 which are fixed to the upper end of the wall portions 30, 31. Supported on the rods 100, 101 are a pair of longitudinally extending baffle members 104, 105 which may swing about the horizontal axis of the rods 100, 101. A central angle iron member 106 extends between the end walls 13, 14 and the flanges of the angle iron member 106 operate as stops or rests for the ends of the baffle members 104, 105. A pair of angle iron members 107, 108 are mounted on the outer wall sections 42, 43 adjacent the upper edges thereof and also operate as stops or rests on which the end of the baffle members 104, 105 may rest. As may be seen in FIG. 2, the baffle members 104, 105 therefore may swing between a position overlying the inner drying chambers formed between the walls 23, 24 and 30, 31 or may be swung to a position indicated in dotted representation to overlie the chambers formed by intermediate walls 30, 31 and the outer walls 40, 41.

The rods 100, 101 extend through the front wall 13 and have fixed thereto a pair of rockarms 109, 110 respectively. The ends of the arms 109, 110 are interconnected by a link 111. Also connected to the arms 109, 110 are a pair of draw cords 112, 113 respectively. The draw cords 112, 113 extend over a pair of guide pulleys 114, 115 respectively so that the ends of the draw cords will clear the panel board 21 and its associated housing. As may be seen by pulling on the draw cord 112 both baffles 104, 105 will swing from an overlying position relative to the inner crop drying chambers to an overlying position relative to the outer crop drying chambers. Conversely by pulling on the cord 113, the baffles 104, 105 will swing from a position overlying the outer crop drying chambers to a position, as shown in FIG. 2, overlying the inner crop drying chambers.

Positioned at the lower ends of the inner crop drying chambers are a pair of baffle or retainer plates 120, 121. The baffle plates extend the length of the dryer and are supported on the depending portions 23a, 24a of the inner upright wall portions 23, 24 by means of hinge brackets 122, 123 which are fixed to the outer face and at the lower end of the portions 23a, 24a. The brackets 122, 123 support elongated rods 124, 125 which extend outwardly of the front wall 13 and have mounted rigidly therewith a pair of rockarms 126, 127. Provided adjacent the outer end of the arms 124, 125 are a pair of arcuate-shaped embossments, one being shown at 128 for the arm 126 with a pin receiving opening at opposite ends thereof. The outer ends of the arms 126, 127 are provided with pins 129, 130 which are biased to seat in the openings in the embossments. Viewing FIG. 2, it becomes apparent that the baffle or retainer plates 120, 121 may be disposed vertically where they will operate to block discharge of the material from the inner crop drying chambers or may be swung to a position shown in dotted representation in FIG. 2 where the crop drying chambers will be opened at their lower ends for discharge into the auger conveyor 49. The baffle plates 120, 121 are adjustably mounted by means of the rockarms 126, 127 and the associated pins. The positioning of the baffle members 120, 121 is therefore determined by the location of the rockarms 126, 127 and may be locked in the desired position by dropping the pins 129, 130 in the correct opening in the embossments.

Adjacent the lower ends of the crop drying chambers are a pair of baffle or retainer plates 140, 141. The retainer plates 140, 141 are fixed to longitudinally extending rods 143, 144 on hinge plates or brackets 145, 146 fixed to the wall structures 30, 31. The rods 143, 144 extend outwardly the forward end of the front wall 13 and have rigidly fixed thereto a pair of arms 147, 148. The upper or outer ends of the arms 147, 148 have pins 149, 150 respectively which are biased to seat in a pair of openings carried on opposite ends of embossed arcuate portions, one of which is shown at 151, rigid with the front wall 13.

Viewing FIG. 2, the retainer or baffle plates 140, 141 may swing between a position shown in full lines or substantially vertical so as to close the lower ends of the outer crop drying chambers and a position in which the lower edge of the retainer or baffle plates 140, 141 contact the upper surface of the panel structure 52. In the latter position, of course, grain may pass through the metering wheels 50, 51 and be moved into the conveyor 49. The holes in the opposite ends of the arcuate-shaped embossments serve to obviously hold the retainer plates 140, 141 in either of the desired positions.

The crop dryer operates in the following manner. Material or grain is initially entered from the conveyor 70, 71 to the overhead conveyor 60 where the grain will pass into the upper portion of the crop drying chambers. Assuming for the moment that both the inner and outer chambers are empty, it will normally be desirous to fill the outer chambers by placing the upper baffles 104, 105 in a position in which they close the inner chambers and to also close the retainer walls 140, 141 at the lower ends of the outer chambers. Grain will then fill the outer chambers whereupon the heating unit may be started and the drying process begun.

The inner and outer crop drying chambers will have substantially equal capacity and each is designed to hold a normal truck load of grain. Consequently, in initially loading the dryer, upon loading the outer chamber there will be a considerable length of time lapse before the truck can be reloaded and be returned to the dryer. During this time the grain in the outer chamber will become partially dried. In the preferred drying operation the grain in the outer chambers will then be moved into the inner drying chambers. This, of course, may be done by opening the baffles or retainer walls 140, 141 at the lower end of the outer chamber, closing the retainer walls 120, 121 at the lower end of the inner chamber and positioning the baffles 104, 105 to overlie the outer chambers as is shown in dotted representation in FIG. 2. This then will permit the grain to be recirculated in the dryer from the outer to the inner chamber by movement through the discharge conveyor 49, the elevator 68, and the overhead conveyor 60. It is felt that this is a preferred form of drying since it is desirous to blend the grain as it moves from one chamber to the other to overcome the condition that arises due to some portions of the grain becoming more completely dried than other portions. Blending of the grain will occur as it moves through the conveyors 49, 60, and elevator 68 and consequently a more uniformly dried grain will be moved into the inner chambers.

The upper baffles 104, 105 may then be swung to a position in which they overlie the inner chamber and grain falling on the baffles 104, 105 will gravitate into the outer crop drying chambers. Relatively wet grain from the truck is discharged into the trough 70 and moved upwardly through the elevator 68 to be discharged in the overhead conveyor 60 and then into the outer chambers. The lower retainer walls 140, 141 will be closed at the lower end of the outer chambers. In order to completely dry the grain in the inner chambers, considerable warm air must pass through the walls 23, 24 and 30, 31 and obviously outwardly through the outer chambers to contact the wet or greener grain and to partially dry that grain.

Upon completing drying of the grain in the inner chambers, the baffles 120, 121 will be swung to open position and the grain be permitted to pass into the conveyor 49 where it will be driven outwardly of the unit by discharging it from the spout 69. Following removal of the grain from the inner chambers, the retainer walls 140, 141 are open and the grain from the outer chambers will pass into the conveyor 49 where it will then be recirculated through the elevator 68 and overhead conveyor 60. The baffles 104, 105 will close the outer crop drying chambers and the semi-dry grain will then pass into the inner chambers. Following the inner chambers being filled with the semi-dry crop, the outer chambers will then be opened and new or wet grain will be passed into those chambers.

In many instances it will be desired to cool the grain or crop within the inner chamber after it has become dry. Consequently the heating unit will be turned off and only the fan will operate to draw atmospheric air and move it through the inner chambers and through the relatively hot dried corn and outwardly through the outer chambers. It will become apparent therefore that the air moving through the inner chambers will pick up the latent heat from the dried grain within those chambers and will then operate to dry the grain in the outer chambers.

In many instances, there may be considerable advantage in circulating the grain or crop in one of the crop drying chambers while the grain or crop in the other chamber is retained in a stationary condition. For example, should it be desirous to recirculate the crop in the outer chambers in the initial stages of drying, the baffle or retainer plates 140, 141 may be moved into an open position and the baffle plates 104, 105 may be moved into an open position relative to the outer chambers. Consequently by operating the metering wheels 50, 51 as well as the auger conveyor 49, the elevator 68 and the overhead conveyor 60, the crop in the outer chambers may be continuously recirculated as the crop in the inner chambers is held stationary in its final drying process. Conversely, if it would be desired to recirculate the crop in the inner drying chambers, it becomes obvious that the baffles 104, 105 and 120, 121 may be suitably adjusted.

While only one form of the invention has been shown it should be recognized that other forms and variations will occur to those skilled in the art. Therefore, while the present invention was shown and described in detail for the purpose of clearly and concisely illustrating the principles of the invention it should be understood that it was not the intention to so limit or narrow the invention beyond the broad concepts set forth in the appended claims.

What is claimed is:

1. A crop dryer comprising: a heating unit effecting a pressurized heating area; an inner and upright wall structure adjacent to and generally surrounding the heating area; intermediate upright wall structure spaced from the inner wall structure and forming therewith a pair of longitudinally extending inner upright material drying chambers on opposite sides of the heating area; outer upright wall structure spaced outwardly of and surrounding the intermediate wall structure and forming therewith a pair of longitudinally extending outer upright material drying chambers, said inner, intermediate, and outer wall structure being perforated whereby air from the pressurized heating area may move outwardly through the inner and outer drying chambers, each of said inner and outer pair of drying chambers diverging and converging in inclined relation respectively above and below the heating area, said inner and outer chambers opening upwardly to receive material and opening downwardly to discharge material; a longitudinally extending conveyor-feeding mechanism above the chambers discharging material into the drying chambers; adjustable baffle means above the chambers and below the conveyor-feeding mechanism effective to selectively direct material into the inner or outer material drying chambers; a material discharge conveyor disposed longitudinally relative to and beneath the chambers for receiving material therefrom; and retainer means at the base of the drying chambers for retaining material within the chambers, said retainer means being adjustable to selectively effect discharge of the materials from the chambers into the material discharge conveyor.

2. A crop dryer comprising: a heating unit effecting a pressurized heating area; an inner and upright wall structure adjacent to and generally surrounding the heating area and defining an elongated horizontally disposed inner casing about the heating area; intermediate upright wall structure spaced from the inner wall structure and defining an intermediate casing generally surrounding the inner casing; outer upright wall structure spaced outwardly of and surrounding the intermediate wall structure and defining an outer casing generally surrounding said inner and intermediate casing, said inner, intermediate, and outer wall structure being perforated whereby air from the pressurized heating area may move outwardly through the casings, said intermediate and outer casings having upper material receiving openings to pass material into the areas between the intermediate and inner casings and intermediate and outer casings respectively and lower material discharge openings to discharge material from the aforesaid areas; a longitudinally extending conveyor-feeding mechanism above the casings for discharging material into the aforesaid areas; adjustable baffle means above the casings and below the conveyor-feeding mechanism effective to selectively direct material into the aforesaid areas; a material discharge conveyor disposed longitudinally relative to and beneath the casings for receiving material from the aforesaid areas, said discharge conveyor being adaptable to selectively discharge materials into the conveyor-feeding mechanism or to discharge materials out of the dryer; and retainer means at the discharge openings of the casings for retaining material within the aforesaid areas, said retainer means being adjustable to selectively effect discharge of the materials from any of the aforesaid areas into the material discharge conveyor.

3. A crop dryer comprising: a heating unit effecting a pressurized heating area; an elongated horizontally disposed inner casing surrounding the heating area; an intermediate horizontally disposed casing generally surrounding the inner casing; an outer horizontally disposed casing generally surrounding said inner and intermediate casing, said inner, intermediate, and outer casings being perforated whereby air from the pressurized heating area may move outwardly through the casings, said intermediate and outer casings having upper material receiving openings to pass material into the areas between the intermediate and inner casings and intermediate and outer casings respectively and lower material discharge openings to discharge material from the aforesaid areas; a longitudinally extending conveyor-feeding mechanism above the casings for discharging material into the aforesaid areas; baffle means above the casings and below the conveyor-feeding mechanism effective to selectively direct material into the aforesaid areas; a material discharge conveyor beneath the casings for receiving material from the aforesaid areas, said discharge conveyor being adaptable to selectively discharge materials into the conveyor-feeding mechanism or to discharge materials out of the dryer; and retainer means at the discharge openings of the casings for retaining material within the aforesaid areas, said retainer means being adjustable to selectively effect discharge of the materials from any of the aforesaid areas into the material discharge conveyor.

4. A crop dryer comprising: a heating unit effecting a pressurized heating area; an elongated inner casing surrounding the heating area; an intermediate casing generally surrounding the inner casing; an outer casing generally surrounding said inner and intermediate casing, said inner, intermediate, and outer casings being perforated whereby air from the pressurized heating area may move outwardly through the casings, said intermediate and outer casings having upper material receiving openings to pass material into the areas between the intermediate and inner casings and intermediate and outer casings respectively and lower material discharge openings to discharge material from the aforesaid areas; a conveyor-feeding mechanism above the casings for discharging material into the aforesaid areas; means above the casings and below the conveyor-feeding mechanism effective to selectively direct material into the aforesaid areas, said latter means being adjustable to block passage of material into the aforesaid areas; a material discharge conveyor beneath the casings for receiving material from the aforesaid areas, said discharge conveyor being adaptable to selectively discharge materials into the conveyor-feeding mechanism or to discharge materials out of the dryer; and retainer means at the discharge openings of the casings for retaining material within the aforesaid areas, said retainer means being adjustable to selectively effect discharge of the materials from any of the aforesaid areas into the material discharge conveyor.

5. A crop dryer comprising: a heating unit effecting a pressurized heating area; an elongated inner casing surrounding the heating area; an intermediate casing generally surrounding the inner casing; an outer casing generally surrounding said inner and intermediate casing, said inner, intermediate, and outer casings being perforated whereby air from the pressurized heating area may move outwardly through the casings, said intermediate and outer casings having upper material receiving openings to pass material into the areas between the intermediate and inner casings and intermediate and outer casings respectively and lower material discharge openings to discharge material from the aforesaid areas; a conveyor-feeding mechanism above the casings for discharging material into the aforesaid areas; a material discharge conveyor beneath the casings for receiving material from the aforesaid areas, said discharge conveyor being adaptable to selectively discharge materials into the conveyor-feeding mechanism or to discharge materials out of the dryer; and retainer means at the discharge openings of the casings for retaining material within the aforesaid areas, said retainer means being adjustable to selectively effect discharge of the materials from any of the aforesaid areas into the material discharge conveyor whereby one of said areas may be emptied to the exclusion of the other.

6. A crop dryer comprising: a heating unit effecting a pressurized heating area; a plurality of elongated horizontally disposed casings surrounding the heating area, said casings being spaced at varying distances from the heating area, said casings thereby forming with one another a plurality of drying chambers about the heating area, said casings being pervious to permit air from the pressurized heating area to move outwardly through the casings and through the crop drying chambers; a longitudinally extending conveyor-feeding mechanism above the casings for discharging material into the aforesaid drying chambers; adjustable baffle means above the casings and below the conveyor-feeding mechanism effective to selectively direct material into the aforesaid chambers; a material discharge conveyor disposed longitudinally relative to and beneath the casings for receiving material from the drying chambers, said discharge conveyor being adaptable to selectively discharge materials into the conveyor-feeding mechanism or to discharge materials out of the dryer; and retainer means on the casings for retaining material within the aforesaid chambers, said retainer means being adjustable to selectively effect discharge of the materials from the aforesaid chambers into the material discharge conveyor.

7. A crop dryer comprising: a heating unit effecting a pressurized heating area; an inner and upright wall structure adjacent to and generally surrounding the heating area; intermediate upright wall structure spaced from the inner wall structure and forming therewith a pair of longitudinally extending inner upright material drying chambers on opposite sides of the heating area; outer upright wall structure spaced outwardly of and surrounding the intermediate wall structure and forming therewith a pair of longitudinally extending outer upright material drying chambers, each of said inner and outer pair of drying chambers diverging and converging in inclined relation respectively above and below the heating area, said inner intermediate, and outer wall structure being perforated whereby air from the pressurized heating area may move outwardly through the inner and outer drying chambers, said outer and intermediate wall structures having upper horizontally disposed edges spaced apart from one another and said inner wall structure to define openings for receiving material into the chambers; a longitudinally extending conveyor-feeding mechanism above the chambers discharging material into the drying chambers; a pair of longitudinally extending means pivotally mounting the baffles adjacent the upper edges of the intermediate wall structure whereby the baffles may swing in one position to block material from entering the outer chambers and in a second position to block material from entering the inner chambers; a material discharge conveyor disposed longitudinally relative to and beneath the chambers for receiving material therefrom; and retainer means at the base of the drying chambers for retaining material within the chambers, said retainer means being adjustable to selectively effect discharge of the materials from the chambers into the material discharge conveyor.

8. A crop dryer comprising: a perforated inner wall structure forming a chamber; means associated with the chamber effecting a flow of heated air through the wall structure; a perforated intermediate wall spaced from and substantially surrounding the chamber and forming with the latter an inner crop receiving chamber; a perforated outer wall spaced from and substantially surrounding the intermediate wall and forming therewith an outer crop receiving chamber; means for selectively putting material into the inner and outer chambers; and means for selectively removing material out of the inner and outer chambers.

9. The invention defined in claim 8 in which the means for selectively putting material into the inner and outer chambers includes a material conveyor discharging into the dryer with baffle means associated therewith for selectively directing material into the chambers.

10. The invention defined in claim 9 in which the means for selectively removing material from the chambers includes a discharge conveyor for receiving materials from the chambers and adjustable baffle means associated therewith for selectively directing material from the chambers into the discharge conveyor.

11. A crop dryer comprising: a perforated inner wall structure forming a plenum chamber means in the plenum chamber effecting a flow of heated air through the wall structure; a perforated intermediate wall spaced from and substantially surrounding the plenum chamber and forming with the latter an inner crop receiving chamber; a perforated outer wall spaced from and substantially surrounding the intermediate wall and forming therewith an outer crop receiving chamber; means for selectively putting material into either of the chambers; and means for selectively removing material out of either of the chambers; said latter means being further adaptable to move material into the former means whereby material being removed from either of said chambers may be recirculated through at least one of said chambers.

12. A crop dryer comprising: a heating unit effecting a pressurized heating area; an inner and upright wall structure adjacent to and generally surrounding the heating area and having an overlying portion above the heating area; intermediate upright wall structure spaced from the inner wall structure and forming therewith a pair of longitudinally extending inner upright material drying chambers on opposite sides of the heating area, said intermediate upright wall structure having a pair of longitudinally extending upper terminal edges defining a central longitudinal inlet above the aforesaid overlying portion; outer upright wall structure spaced outwardly of and surrounding the intermediate wall structure and forming therewith a pair of longitudinally extending outer upright material drying chambers, said outer wall structure defining with the aforesaid upper terminal edges a pair of material inlets to the outer drying chambers, said inner, intermediate, and outer wall structure being perforated whereby air from the pressurized heating area may move outwardly through the inner and outer drying chambers, each of said inner and outer pair of drying chambers diverging and converging in inclined relation respectively above and below the heating area; a longitudinally extending conveyor-feeding mechanism directly above the central longitudinal inlet discharging material into the drying chambers; a material discharge conveyor disposed longitudinally relative to and beneath the chambers for receiving material therefrom; and retainer means at the base of the drying chambers for retaining material within the chambers.

References Cited in the file of this patent

UNITED STATES PATENTS

| | | |
|---|---|---|
| 921,395 | Hager | May 11, 1909 |
| 2,732,630 | Markowich | Jan. 31, 1956 |
| 2,740,204 | Seltzer et al. | Apr. 3, 1956 |
| 2,962,818 | Forth | Dec. 6, 1960 |

FOREIGN PATENTS

| | | |
|---|---|---|
| 528,257 | Italy | June 11, 1955 |